(12) United States Patent  (10) Patent No.: US 9,095,215 B1
Caruso  (45) Date of Patent: Aug. 4, 2015

(54) CUSTOM CONTROLLED SEATING SURFACE TECHNOLOGIES

(71) Applicant: Steven Jerome Caruso, Antioch, IL (US)

(72) Inventor: Steven Jerome Caruso, Antioch, IL (US)

(*) Notice: Subject to any disclaimer, the term of this patent is extended or adjusted under 35 U.S.C. 154(b) by 0 days.

(21) Appl. No.: 14/079,528

(22) Filed: Nov. 13, 2013

Related U.S. Application Data

(63) Continuation of application No. 12/648,272, filed on Dec. 28, 2009, now Pat. No. 8,596,716.

(60) Provisional application No. 61/204,045, filed on Dec. 31, 2008.

(51) Int. Cl.
  *A47C 7/00* (2006.01)
  *B60N 2/44* (2006.01)

(52) U.S. Cl.
  CPC .... *A47C 7/00* (2013.01); *B60N 2/44* (2013.01)

(58) Field of Classification Search
  USPC ............... 297/217.3, 217.1, 284.1, 284.3; 345/175–176
  See application file for complete search history.

(56) References Cited

U.S. PATENT DOCUMENTS

| | | | |
|---|---|---|---|
| 3,137,773 A | 6/1964 | Black |
| 4,680,790 A | 7/1987 | Packard |
| 4,779,615 A | 10/1988 | Frazier |
| 5,304,112 A | 4/1994 | Mrklas |
| 5,625,914 A | 5/1997 | Schwab |
| 5,864,105 A | 1/1999 | Andrews |
| 5,868,687 A | 2/1999 | Tedesco |
| 6,055,473 A | 4/2000 | Zwolinski |
| 6,064,932 A | 5/2000 | Francois |
| 6,088,643 A | 7/2000 | Long |
| 6,115,860 A | 9/2000 | Vrzalik |
| 6,157,372 A | 12/2000 | Blackburn |
| 6,254,186 B1 | 7/2001 | Falzon |
| 6,290,661 B1 | 9/2001 | Cutler |
| 6,351,678 B1 | 2/2002 | Borders |
| 6,396,224 B1 | 5/2002 | Luff |
| 6,507,172 B2 | 1/2003 | Sherman |
| 6,560,492 B2 | 5/2003 | Borders |
| 6,573,673 B1 | 6/2003 | Hampel |
| 6,578,916 B2 | 6/2003 | Longhi |
| 6,676,615 B2 | 1/2004 | Flick |
| 6,870,477 B2 | 3/2005 | Gruteser |

(Continued)

OTHER PUBLICATIONS

Heartland America, Shiatsu Massage Chair, advertisement, http://www.heartlandamerica.com/browse/item.asp?product=shiatsu-massage-chair&PIN=28402&GUID=44CAC07E-43D3-4E8E-8844-C76F4DFBAFFC&BC=S&DL=SEH1, retrieved from internet Jan. 27, 2007.

(Continued)

*Primary Examiner* — Sarah B McPartlin
(74) *Attorney, Agent, or Firm* — McAndrews, Held & Malloy, Ltd.

(57) ABSTRACT

A system of controlling various actuators associated with human support surfaces is disclosed. Such a system is made up of a support surface, a controller, and an actuator. The system may optionally include batteries, a means of charging the batteries, and a graphical user interface as well as a communication link between the graphical user interface and the support surfaces. The actuators are capable of altering contour and/or firmness, of a support surface, they may be vibrational or heating/cooling in nature, and they may also alter the overall relative position of a support surface to another support surface, and/or to the ground plane.

12 Claims, 18 Drawing Sheets

(56) References Cited

U.S. PATENT DOCUMENTS

| | | | |
|---|---|---|---|
| 7,163,263 B1 | 1/2007 | Kurrasch | |
| 7,197,364 B2 | 3/2007 | Chernoff | |
| 7,338,459 B2 | 3/2008 | Swidler | |
| 7,393,053 B2 | 7/2008 | Kurrasch | |
| 7,432,459 B2 | 10/2008 | Stoschek | |
| 7,735,918 B2 | 6/2010 | Beck | |
| 7,896,436 B2 | 3/2011 | Kurrasch | |
| 7,911,349 B2 | 3/2011 | Zerhusen | |
| 7,979,169 B2 | 7/2011 | Rawls-Meehan | |
| 8,004,492 B2 | 8/2011 | Kramer | |
| 2003/0075959 A1 | 4/2003 | Xue | |
| 2003/0212352 A1 | 11/2003 | Kahn | |
| 2004/0111045 A1* | 6/2004 | Sullivan et al. | 600/595 |
| 2005/0046584 A1 | 3/2005 | Breed | |
| 2005/0052427 A1 | 3/2005 | Wu | |
| 2005/0127866 A1 | 6/2005 | Hamilton | |
| 2006/0117482 A1 | 6/2006 | Brandon | |
| 2006/0185968 A1 | 8/2006 | Dzioba | |
| 2007/0108809 A1 | 5/2007 | Kurrasch | |
| 2008/0211684 A1 | 9/2008 | Beck | |
| 2008/0235872 A1 | 10/2008 | Newkirk | |
| 2009/0151073 A1 | 6/2009 | Kramer | |
| 2009/0210110 A1 | 8/2009 | Dybalski | |
| 2010/0207434 A1 | 8/2010 | Kurrasch | |
| 2011/0231996 A1 | 9/2011 | Lemire | |
| 2012/0102434 A1 | 4/2012 | Zerhusen et al. | |

OTHER PUBLICATIONS

InSeat Solutions, LLC, "Office Seating", 2001, http://www.relaxor.com/pages/office.html.

Stumpf, Bill; Chadwick, Don; and Dowell, Bill, "Aeron: The Art of Pressure Distribusion", Herman Miller, Inc., http://www.project-inrichting.nl/pdf/Aeron-Art_of_pressure_distribution-Witteveen.pdf, 2009.

Herman Miller, Inc., "Cross Performance at Work", 2001, http://www.hermanmiller.com/hm/content/research_summaries/wp_Cross_Perform.pdf.

Herman Miller, Inc., "If the Chair Fits.", Research Summary, 2008, Zeeland, Michigan, http://www.hermanmiller.com/MarketFacingTech/hmc/research_summaries/pdfs/wp_If_the_Chair_Fits.pdf.

Herman Miller, Inc., "The Art and Science of Pressure Distribution", Solution Essay, 2009.

"Microsoft Kinect Release Date Nears" Nov. 2, 2010 http://www.onwindows.com/Articles/Microsoft-Kinect-release-date-nears/5419/Default.aspx. [Retrieved from the internet Jan. 10, 2013].

Fingas, John, "Kinect Toolbox update turns hand gestures into mouse input, physical contact into distant memory", Aug. 1, 2012, http://www.engadget.com/2012/08/01/kinect-toolbox-update-turns-hand-gestures-into-mouse-input. [Retrieved from the internet Jan. 10, 2013].

\* cited by examiner

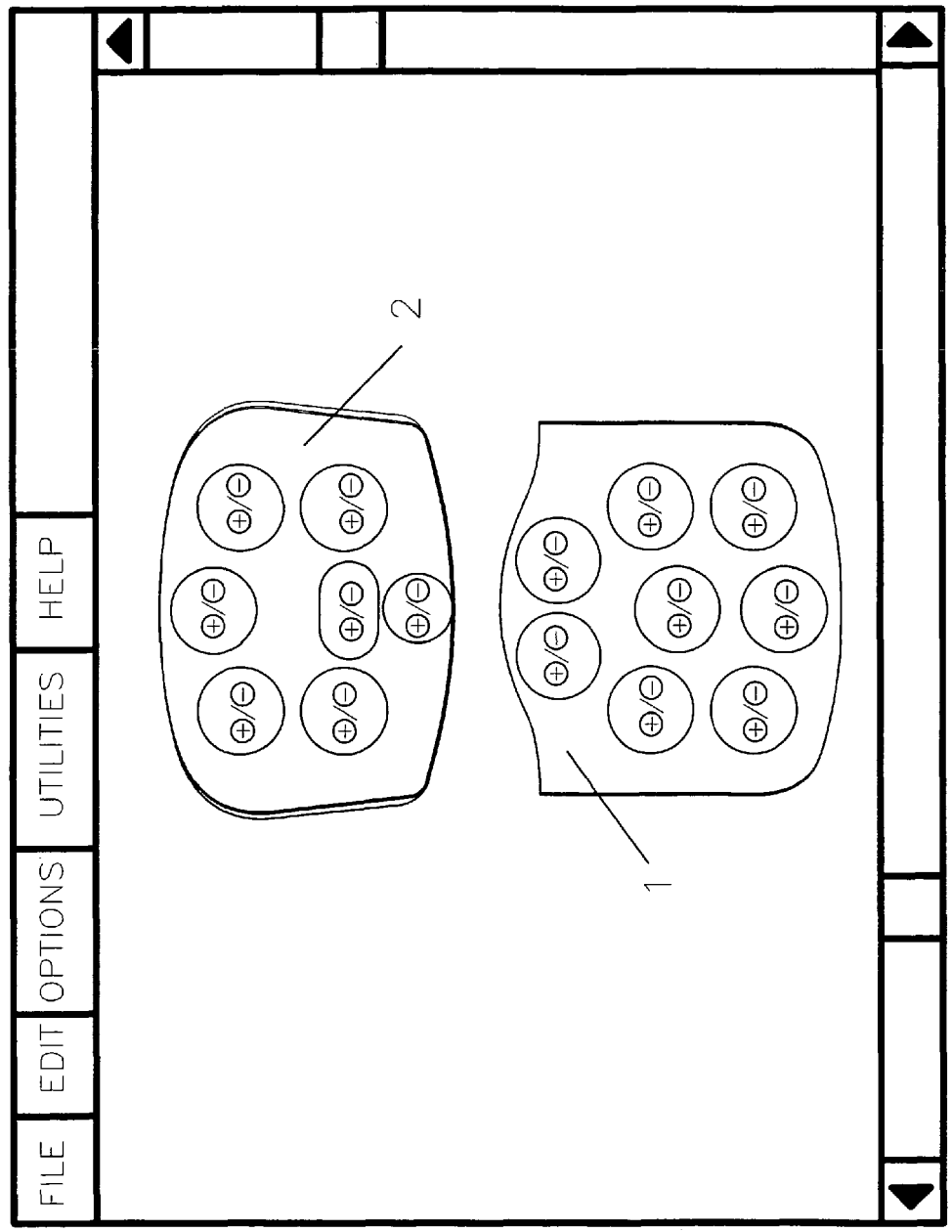

CUSTOM CONTROLLED SEATING SURFACE TECHNOLOGIES

CROSS REFERENCE TO RELATED APPLICATIONS

This application is a continuation of U.S. Ser. No. 12/648,272, filed Dec. 28, 2009, now pending, which claims the benefit of U.S. Provisional Application Ser. No. 61/204,045, filed Dec. 31, 2008. These priority applications, including all attachments, exhibits, and appendices, are incorporated by reference here in their entirety to provide continuity of disclosure.

The inventor also has a co-pending application Ser. No. 12/082,571 filed Apr. 12, 2008. That application is related to U.S. application Ser. No. 11/295,789, filed Dec. 7, 2005. That application is related to U.S. Provisional Application Ser. No. 60/633,956, filed Dec. 7, 2004. Each application referred to in this paragraph is incorporated here by reference in its entirety to provide continuity of disclosure. The entire disclosure of all applications is hereby incorporated herein by reference.

FIELD OF INVENTION

The present invention relates to chairs and seating, as well as other body support surfaces, normally associated with but not limited to residential or commercial office work. These chairs employ a number of methods to enhance the user's comfort and promote ergonomically healthy sitting. These methods include various forms of padding and flexing of the seat and back as well as separate mechanical controls that control the overall movements of the seat and back, often referred to as chair controls or chair irons.

BACKGROUND OF THE INVENTION

Various approaches to making a chair's seat and back form fitting for various users are known in the industries of seating manufacture. These approaches range from the rather traditional use of contouring synthetic foam, to seat/back shells that have a degree of flex. There have also been approaches that employ various mechanisms to vary the firmness of selected areas of a seating structure. Several problems exist with each of these approaches though.

In the case of simply using foam padding, under normal manufacturing conditions it is difficult if not impossible to properly select contours that fit all of the population. And so often a softer variety of foam must be selected so that the occupants can reform to a degree the contours. And so, either improper contouring must be used or the chair is unsupportive through it being too soft.

In the case of incorporating flex into the shells of a chair, no geometry to date has achieved the proper amount of flex in the right areas to give correct ergonomic comfort for a wide range of individuals. In the case of a sling approach, the curves imparted on the sling by the frame are simple in nature (non-compound) and thus cannot provide the proper contouring necessary for ergonomic comfort. Also, this approach leads to "hammocking". Hammocking is when the sling is pressed in one area; the areas immediately adjacent have the tendency of folding inward, squeezing the occupant, again not yielding the proper ergonomic curvatures. An additional problem with sling chairs is that if the manufacturer makes the supporting sling surface taut enough to properly support a large-heavy person, the tension on the sling will be too great for a smaller person, resulting in discomfort.

Finally, the present state of the art dictates that the contours a designer may choose in seating design be generic in nature to accommodate the widest range of the population possible. In an effort to increase comfort, manufacturers have produced "sized" (i.e. small, medium and large) chairs that effectively narrow the amount of contouring-compromise that the designer must normally exercise. Unfortunately, this leads to the manufacturer having to tool three independent products instead of one, and the manufacturers, wholesalers, and retailers having to stock (in this example) three times the quantity of product. Additionally, the end user is stuck with a chair that at some point in the future may be the wrong size. Moreover, sizing is not an absolute in defining the particular contours that an individual may desire. This invention addresses these shortcomings with a new and novel approach to seating adjustment and control.

BRIEF DESCRIPTION OF DRAWINGS

FIG. 19 is a plan view of a proposed interface for controlling the actuator(s).

LIST OF REFERENCE NUMERALS USED IN THE FIGURES

Figure 1:
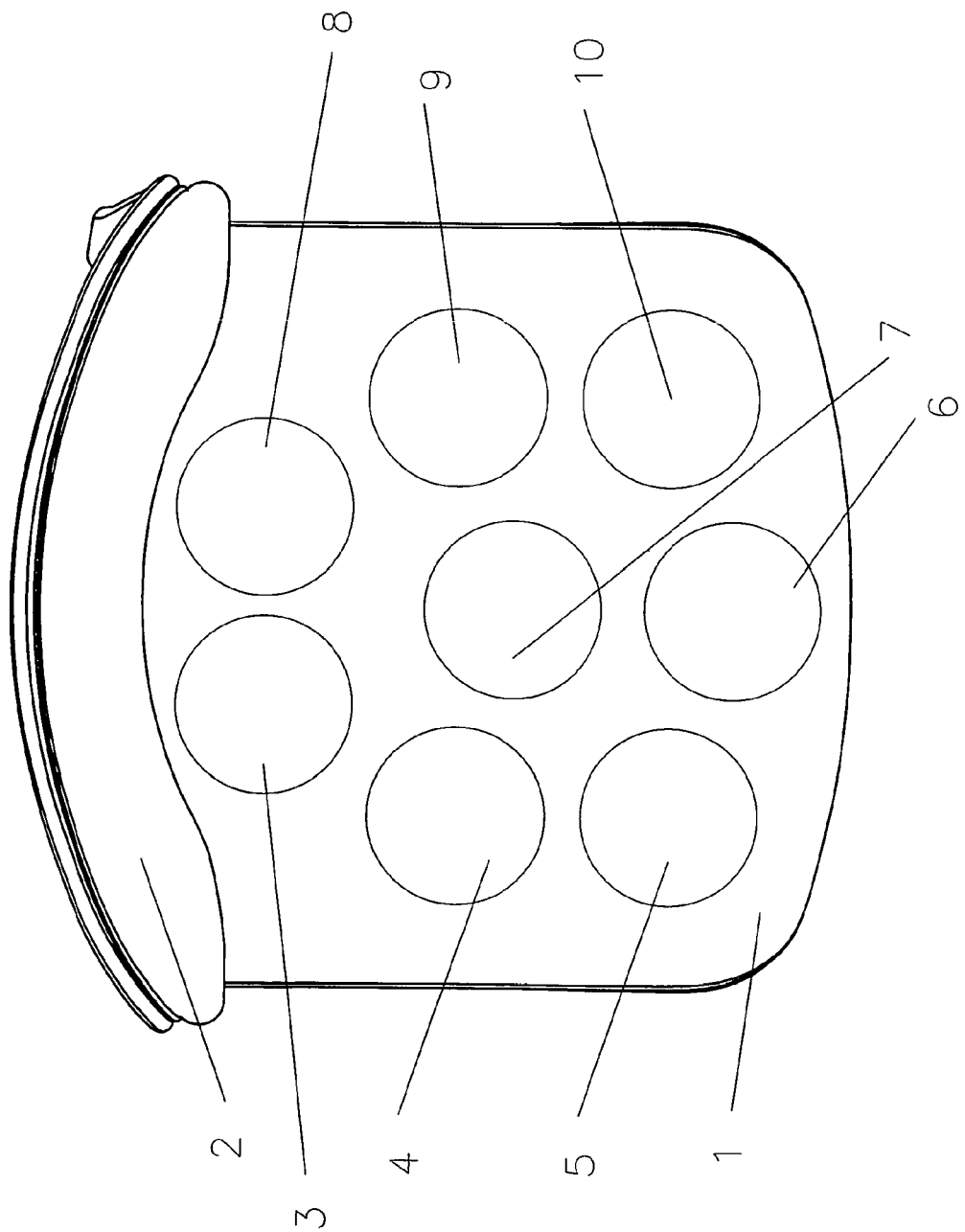
FIG. 1 is top view of a chair employing the invention.

1. Seat seating surface
2. Back seating surface

3. A proposed adjustment zone/region.
4. A proposed adjustment zone/region.
5. A proposed adjustment zone/region.
6. A proposed adjustment zone/region.
7. A proposed adjustment zone/region.
8. A proposed adjustment zone/region.
9. A proposed adjustment zone/region.
10. A proposed adjustment zone/region.
11. A proposed adjustment zone/region.
12. A proposed adjustment zone/region.
13. A proposed adjustment zone/region.
14. A proposed adjustment zone/region.
15. A proposed adjustment zone/region.
16. A proposed adjustment zone/region.
17. A proposed adjustment zone/region.
18. Fluid bladder.
19. Fluid Conduit.
20. Seam of 18.
21. Foam or outer shell surface.
22. Dissipation layer and/or contour form.
23. Bladder or actuator level/layer.
24. Support shell.
25. Mechanical actuator.
26. Flexible member.
27. Screw actuator.
28. Nut of actuator.
29. Lever.
30. Fixed member relative to the rest of the cushion/seating surface assembly.
31. Actuator or bladder pocket.
32. Pivot/flex pivot.
33. Worm.
34. Worm spur.
35. Base plate or bottom of 31 or 24.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications and equivalents within the spirit and scope of the invention.

It is a handicap to the designer to try to design a chair with the proper contours for the full range of the population. The resulting designs and contours are necessarily compromises, and thus are not optimal for any given individual. In an effort to overcome these limitations, manufacturers have produced "sized" (i.e. small, medium and large) chairs that effectively narrow the amount of contouring-compromise that the designer must normally exercise. The fact of the matter is that there are several aspects to sizing. The first, and most obvious, is the overall sizing of the surfaces as far as width, height etc. As far as comfort is concerned, this is the least important aspect of seating surface design. Appropriately sized seating surfaces can be formulated that satisfy the extremes. What is most important in achieving seating comfort is the contouring that occurs within whatever sized seating surface is chosen. Unfortunately, this contouring varies greatly from a small individual, to a large one. Additionally, some individuals who seemingly share the same body types prefer differing contours such as stronger/weaker lumbar contours. Although the present invention addresses this need for variable contouring through its customizable structure, further advantages in comfort can be realized if the initial contours of the seating structure are in generally the proper range. Through the present invention's unique method of construction, these goals are all achievable. In addition to seating, various embodiments of this invention may be applicable to other types of surfaces that support a human such as beds, automotive seating, or a separate support surface, cushion or pad that is to be used with/placed upon another surface such as a chair or bed etc.

All of the embodiments deal with the placement of actuators in various areas of a surface to support an individual's body. These actuators may make the area that they are in firmer. Alternatively, these actuators may re-contour the area that they are in as well as adjacent areas. And alternatively, such actuators may be vibrational, or heat generating in nature. And alternatively yet, these actuators may reposition the support surface to better support an individual's body. One example of this is movable armrests on a chair. There is an important distinction between firming an area of a seating surface (not letting the occupant sink in as much) as opposed to maintaining a given firmness level through the use of a set thickness of padding etc. and changing the contours through the actuation of an actuator. As will become apparent in the disclosure, the difference between firming and recontouring is accomplished by varying the resiliency of the various components that make up the system. In its simplest form, when the layer(s) closest to the user are made to be less resilient than they were previously, firming is accomplished. Alternatively, when the layer(s) resiliency closest to the user is maintained, but the shape has changed, recontouring is accomplished. However, when more than one actuator or system surface is contemplated, as is often the case in this disclosure, that which was solely a firming scenario, as previously presented, may be a recontouring scenario given the potential relative positions of all actuators at any one time. So while some embodiments of the invention are directed at varying firmness, other embodiments are directed at the goal of varying the contours with the same amount of firmness throughout the range of adjustment, and still others contemplate that by varying the firmness of some areas relative to others, a variance in contour is achievable. One type of actuator under consideration is an electro-mechanical actuator. Such an actuator may be designed with motors, gears, linkages linear motors, piezo-electric motors or nytinol wire etc. Another type of actuator is a bladder/or hydraulic system that can be inflated and deflated with a working fluid such as air or water or that uses a piston arrangement. Another type of actuator is a vibrational actuator that can stimulate the user in various zones. Another type of actuator is a heat module that can heat or cool the zones. And so these modules may be used alone or in combination with each other, within a single zone, or within the entire body-supporting structure.

Also common to all the disclosed embodiments are various methods for controlling the actuators. As such, the proposed technologies may be controlled through several interfaces. One such interface is a keypad entry system coupled directly to a part of the chair or cushions. Such an interface may be on a wire tether, or pendant or be located in another easily accessible area. One example is that an arm-pad may be pivotable to reveal the keypad. Another is that the keypad may slide out from under or from within the seat or back cushion, revealing the control interface surface. Optionally, this pendant may be wireless, much like a remote control for various pieces of electronic equipment. This controlling interface may have a dynamic display such as a Liquid Crystal Display/LCD or equivalent display, or static graphics. A dynamic display is defined as one where the graphics are changeable in an electrical or electronic fashion. A static display is defined as one where the graphics are static, or do not change and thus simply act as stationary identifiers for switches. This controlling interface may also rely upon a microprocessor, digital or analog circuitry to accomplish the various modes of operations.

In another embodiment the control of the seating surfaces is controlled via a secondary computer interface. In this sense, the computer could be either be of what is commonly referred to as a Personal Computer/PC, or branded personal computer such as an APPLE/MACINTOSH™ running any one of a variety of operating systems. As such, these terms may be used interchangeably. Since many times the seating will be used in front of a computer, a Graphical User Interface/GUI may be used to control the seating surfaces. In such cases the chair may be tethered to the controlling computer by way of a Serial port, Communication/Com port, Line Print Terminal/LPT/Parallel Port, or Universal Serial Bus/USB port, Bluetooth, LAN (local area network (wired or wireless)), or any other commonly used computer port located on the computer. Such a tether, whether permanent or otherwise may be of the retractable cord-reel variety relative to the controlling computer or support surface to be controlled. Additionally, another way of controlling the seating surfaces via the PC computer GUI, is to have a control-transmitter unit which plugs into one of the computer ports, and then that control-transmitter unit communicates wirelessly with a control-receiving unit located in/on the seating surfaces. The program that provides the GUI, under one of the operating systems, may be created in one of many programming languages such as C, C+, HTML, or Java, as it is cross-platform/operating system compatible.

As the unit needs to be powered, there are several anticipated means for getting power to the seating surfaces. One is to tether the seating surfaces to an electrical source such as a wall outlet. Another is to have a battery pack located in/on the seating surfaces. The battery could be of the disposable variety such as lead-acid, alkaline, etc. and would be replaced when discharged. Also anticipated is that the battery could be rechargeable. The battery pack could be recharged in one of several modes. One such mode is to temporarily tether the seating surfaces/battery to an electrical source such as a wall outlet. Another is to remove the pack, to then recharge it using a line-powered cord/recharging station, and then replace it. So the battery may be removed as a battery pack (defined as more than one cell combined in either series or parallel) to be charged via a charger plugged into a standard wall outlet or to a USB connection which typically provides power at 5 volts/500 milliamps. Another method is to not remove the pack, but instead temporarily tether the seating surfaces/battery to an electrical source such as a USB outlet on a computer, which can supply the appropriate voltage. A circuit can be provided so that the cells may be charged in parallel and discharged or used in series. In this way the actuators may use a voltage that is greater than the recharging voltage. A breakaway connector for the USB/other port is also anticipated, so that in the unfortunate event that the cord is pulled while the chair is charging/communicating, the force to disconnect is less than that to normally disconnect the USB connector, thereby reducing or eliminating damage to either device such as a laptop and the seating surface. Another anticipated method of charging or powering the invention is by providing an induction hot-spot relative to a charging coil so that when the seating surfaces or a part of the associated chair is in close proximity to the hot spot the battery is inductively recharged. And yet another method is to provide charging terminals on some area of the chair so that when the chair is "docked" with a charging station, the charging terminals of the chair come into contact with the charging terminals of the charging station, thus charging the battery.

Several modes of operation of the invention are anticipated. One such mode is that the user adjusts the various zones to an appropriate comfort level, and then readjusts the various zones when change is desired. The various areas of the seating surface may be controlled individually, or in pairs such as left and right, or in known supersets, sets, and subsets made up of various combinations or sub combination(s) of zones. So for example, a superset may be settings for all zones, and a set may new settings for four zones within a super set, and a subset, may be new/alternate settings for two zones within a subset. So nested setting relationships may be created. Of note is that the terms superset, set, and subset are often used interchangeably throughout this disclosure, as under various scenarios, any or all may be applicable.

Another is that several preset "comforts" may be stored. A present comfort is a set level of each of the zones relative to each other, which would result in a set of individual zone settings that may be initiated with a single preset button/program/algorithm. These presets may relate to different users, who may use the same chair or seating surface at differing times. This is often the case in vehicular seating or in office seating that must transient several work shifts. A single user though often would also desire these presets for a variety of reasons. Often comfort requirements differ throughout a workday. Also common is that different tasks and different seating heights could require different comfort requirements. These could be invoked through different presets.

Another mode of operation is where the various zones cycle periodically. This could stimulate blood flow and provide a massaging effect to the user. Such cycling could be a variant of the user's "ideal" for a zone. For example, a particular zone may change periodically from the pre-selected setting (by the user) to plus 5% (or any other percentage) to minus 5% (or any other percentage).

Another mode of operation is where the zones change in response to the position of the seating surfaces. It has been found that the contour requirements of a seating surface often change as the user takes different positions within a chair, such as fully upright versus fully reclined. In other words, a user needs different contours in areas such as the lumbar and sacral areas when he/she is fully upright than when he or she is reclined. The invocation of these different posture-settings can be accomplished through sensors or switches mounted on the seating surfaces or chair which, based on the position of the chair (such as reclined), activate the necessary changes of contour based on a preset or an algorithmic variant. Another anticipated mode is where sensors such as pressure transducers are employed to detect the user's shifting of weight, and the necessary contour changes are actuated based on a preset or an algorithmic function. Any of these anticipated modes may be used individually, or in any combination with each other.

The set-up process or procedure can occur in one of several ways. One such way is all at once. In other words, all custom contours for all the zones can be selected at once, and set into memory as a "contour set", or as the previously mentioned "super set". The setting into memory procedure would occur through the user pressing an appropriate memory button on a pendant or remote, or by selecting the appropriate icon from the graphical user interface of the computer. Alternatively, an incremental approach may be taken, whereby one or several zone custom contours may be selected as a "set" and then additional zone(s) may be added or original zones altered to that set at a later time. Additionally, additional sets or sub-sets may be added or altered at any time and set into memory. Once more than one "contour set" has been created the actuators may move from one set to another. This is useful when the user finds that the zones are highly interdependent on one another's position. In other words, when zone X is in position 1, zone Y is most comfortable in position 3, but when the same zone X is in position 2, zone Y is most comfortable in position 4, and so forth if necessary for any or all of the remaining zones. Sets may be named or assigned a graphical symbol(s). These names or symbols may relate to individual users as well as the supersets, sets, and subsets or routines of those individual users. So user 1 may have his or her sets, supersets, and subsets and user 2 would have theirs. Additionally, user 1 may have a set, superset or subsets tailored for a specific task or time of day. So a user may have a set, superset or subset tailored specifically to keyboarding, mousing, reading, writing, reclining, etc. wherein each of these activities has its own program(s). And a user may also find that they would desire that sets, superset or subsets be tailored to a time-specific regimen. So a user may find that they like a given supersets, sets, and subsets for morning activities when they are relatively "fresh", but mid or late day when they are not so "fresh" and their back is tired they would like an alternative set, superset or subsets.

Alternatively, the user may request a random movement of the individual actuators from one superset/set/subset to another. This can be useful when the user does not find that the some or all of the zones are highly interdependent on one another's position, and instead wants the stimulating effect of the overall movement of the seating surfaces.

Even when one complete superset/set or subset is to replace another, it has been found that in some situations it is advantageous to limit the number of actuators that may be running simultaneously. This is when the actuator's power requirements cumulatively may exceed the power instantaneously available. So it has been found that employing a hardware level limiting circuit and/or prioritizing-logic circuit or a software level prioritizing-logic program is useful.

Several approaches are anticipated for ensuring that the communication, when wireless, does not interfere from one controller pendant/remote/computer and its associated seating surface, and another controller pendant/remote/computer and its associated seating surface. One such method is to use a communication, which is regional such as radio waves, or infrared, or Bluetooth or Wi-Fi. Another, regardless of communication format is to individually code each individual system. Such coding can occur at the hardware or software level through the selection of individual frequencies. Alternatively, such coding can be done on a soft level by having the controller or remote and the seating surfaces having paired identities. In this way the two components that are to communicate wireless sly (the controller/computer/or remote pendant and support surfaces) can transmit and receive commands each with a linked identifier or name, numerical or otherwise, and thus know that the communication was intended for their pairing and not another set of components in proximity of the first set. One way to accomplish this is to the use previously mentioned wired or wireless networking technology or Wi-Fi. One such standard in current use is referred to as 802.11 G. This type of communication/control could have several benefits over the other previously mentioned types of communication/control. It is digital in nature, whereas some of the others are analog in format. Thus the digital signal is not as prone to degradation or interference from other radio signals or existing electrical noise. Additionally Wi-Fi, or similar technology, is inherently Bi directional, allowing the support surfaces to communicate information back to the controller/controlling program or Graphical User Interface. And also, more control channels at a greater precision and speed would be available.

Another anticipated method is for the user to have to manually activate or permit the reception of commands from the wireless controller/computer/remote and the seating support surface. This could be as simple as depressing a switch on either of the two components (the controller/computer/or remote pendant and support surfaces) enabling them to transmit or receive for only a specified period of time, number of commands, or another limiting variable.

Of course, when the controller/computer remote pendant is in wired communication with the support surfaces, this "cross-talk" is not a problem. This wired orientation may be a less than ideal situation when the controlling computer is a desktop, laptop or tower style personal computer. However, in this situation the tethering may be only temporarily necessary. Commands as previously discussed may be periodically downloaded to the seating-support surface and the/an on board controller can exert real time control. In this mode the main computer serves as an advanced graphical user interface and a master processing and memory center. Of note is that the invention at hand may be offered in kit or component form, so that it may be offered to a variety of manufacturers of support surfaces for subsequent integration into their own product(s).

Additionally, while much of this disclosure is directed at the support surfaces for the user's torso, as previously mentioned, other support surfaces are to be included. To that end, arm supports, head-neck supports, foot/leg supports are all to be included as support surfaces. And so the actuators in these zones could act as those already described, altering contour, firmness, be vibrational or heating/cooling in nature, or alternatively be position-alterable. For example the height of a chair's armrests relative to the rest of the chair could be altered by an actuator(s) as well as be made firmer or softer by a different actuator, as well as be contourable by an actuator, and all of these may be controlled by the controller/graphical user interface.

Referring to FIG. 1 a seating surface 1, can be seen. Some contemplated zones 310 for the placement of actuators or bladders can also be seen. Of note are zones 3 and 8 under the ischials, zones 5 and 10 under the front of the user's thighs, and zones 4 and 9, intermediate of the thighs. These six zones are of particular importance, as the varying or altering of these zones cannot only affect comfort with regard to contour, but can also change the user's pelvic tilt or overall attitude relative to the other zones or seating support surfaces, whether they be on the seat or the back. However, this is not to diminish the value of any of the other zones. Additionally, any of these zones may be partitioned into sub-zones or linked to form larger zones or zones of a different size or shape.

Figure 2:
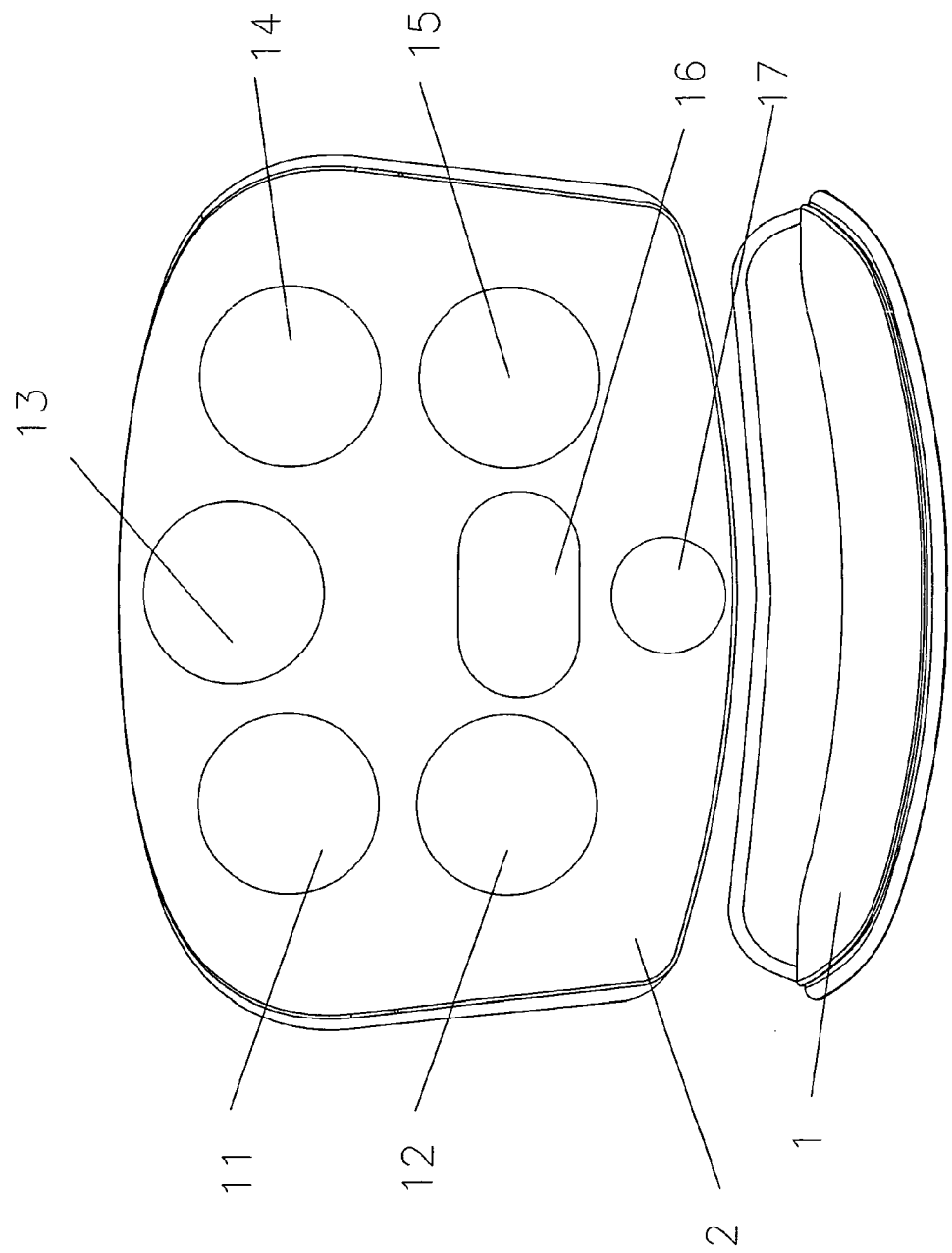
FIG. 2 is a front view of a chair employing the invention.

Referring to FIG. 2 a back seating surface 2, can be seen. Some contemplated zones 11-17, for the placement of actuators or bladders can also be seen. Zones 16 and to some extent zones 12 and 15, are in the lumbar region of which a great deal of emphasis has been put as of late. This has traditionally been handled as a singular area of adjustment within a chair. By breaking it into multiple zones a greater degree of variation, control, and thus comfort can be achieved for a greater percentage of the populace. Zones 11 and 14 are disposed at an approximate position of the user's scapulas. This is an area that is often difficult to sculpt into a shape that is optimized, with regard to comfort, for a large demographic. This is because the perceived comfort fit varies throughout the population greatly, and the amount of adjustment necessary can be equally as great. Zone 17 is in the approximate sacral area of a user. It should be appreciated that by being able to adjust any or all of these zones relative to one another, even from the seat to the back surface, a tremendous number of contour-comfort variations are possible.

Figure 3:
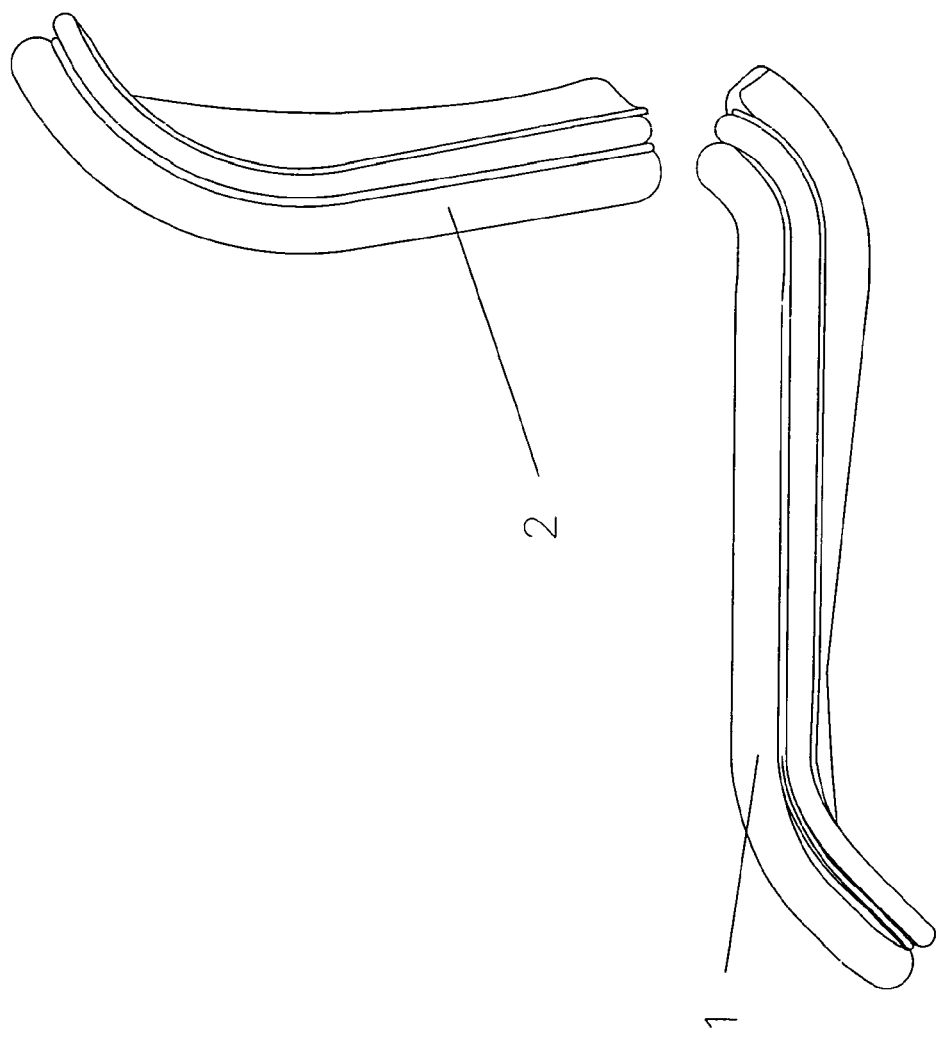
FIG. 3 is a side elevation of the chair and according to the present invention.

FIG. 3 is simply a side view of FIGS. 1 and 2 for greater clarity.

Figure 4:
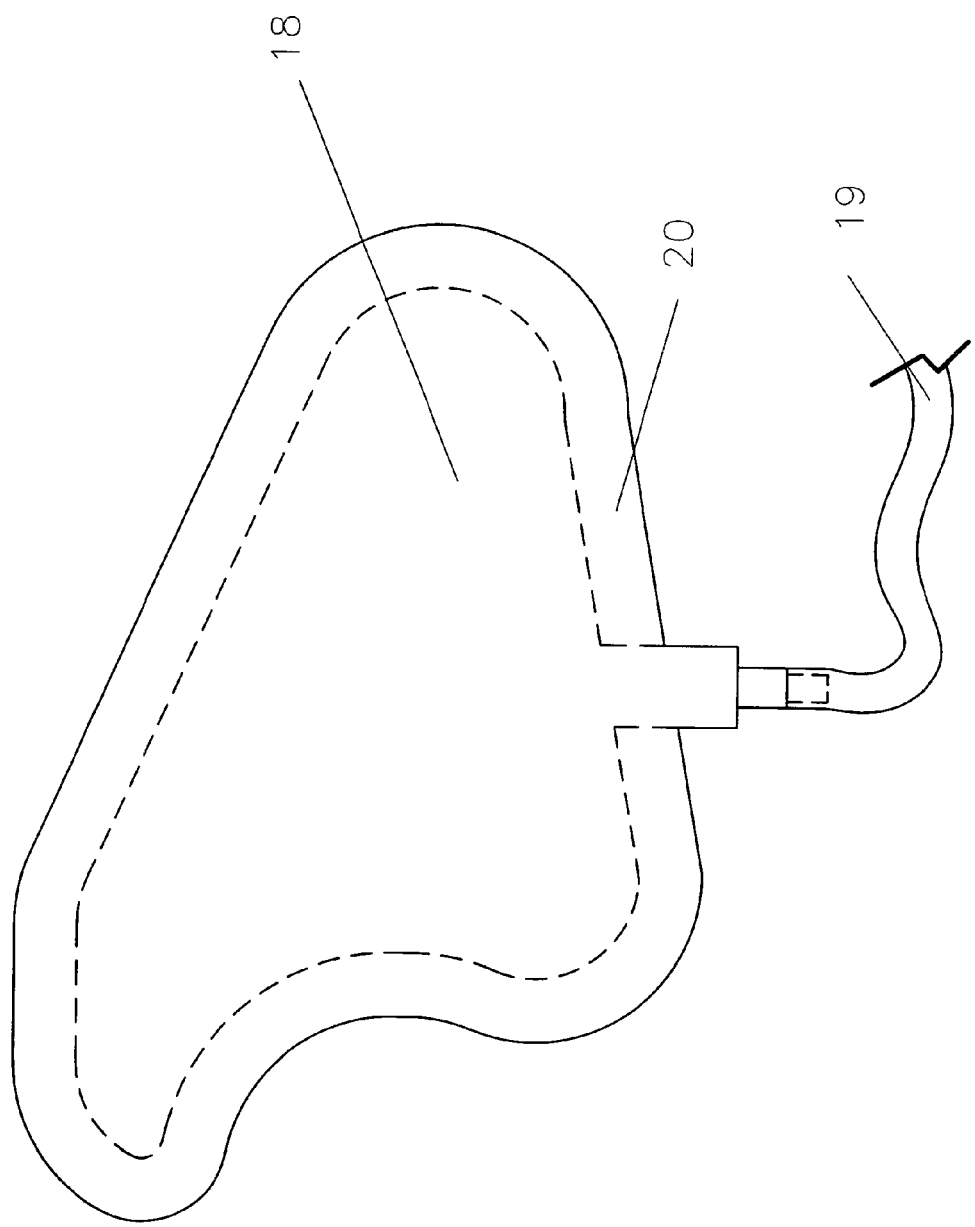
FIG. 4 is a plan view of one embodiment of the invention. It shows that one form of an actuator may take the form of a fluid bladder, which may be variably shaped and has a nominal thickness when deflated.

Referring to FIG. 4, an example fluid bladder actuator, which can be inflated and deflated with a working fluid such as air or water, can be seen. Such a fluid bladder may be variably shaped and notably may have a nominal thickness when deflated. This minimal thickness to maximum inflated thickness as well as inherent dampening and dissipation qualities are much of the appeal of employing such structures. In the embodiments that employ air bladders, sensors may be included in the assembly. These sensors would preferably not only measure the pressure that the occupant exerts, but instead or additionally, monitor the pressure or inflation of the bladders to sense any leak-down. In the embodiments that employ electro-mechanical actuators, sensors may also be included in the assembly. These sensors could provide feedback, not to only measure the pressure that the occupant exerts, but they alternatively measure the position of the actuator.

Figure 5:
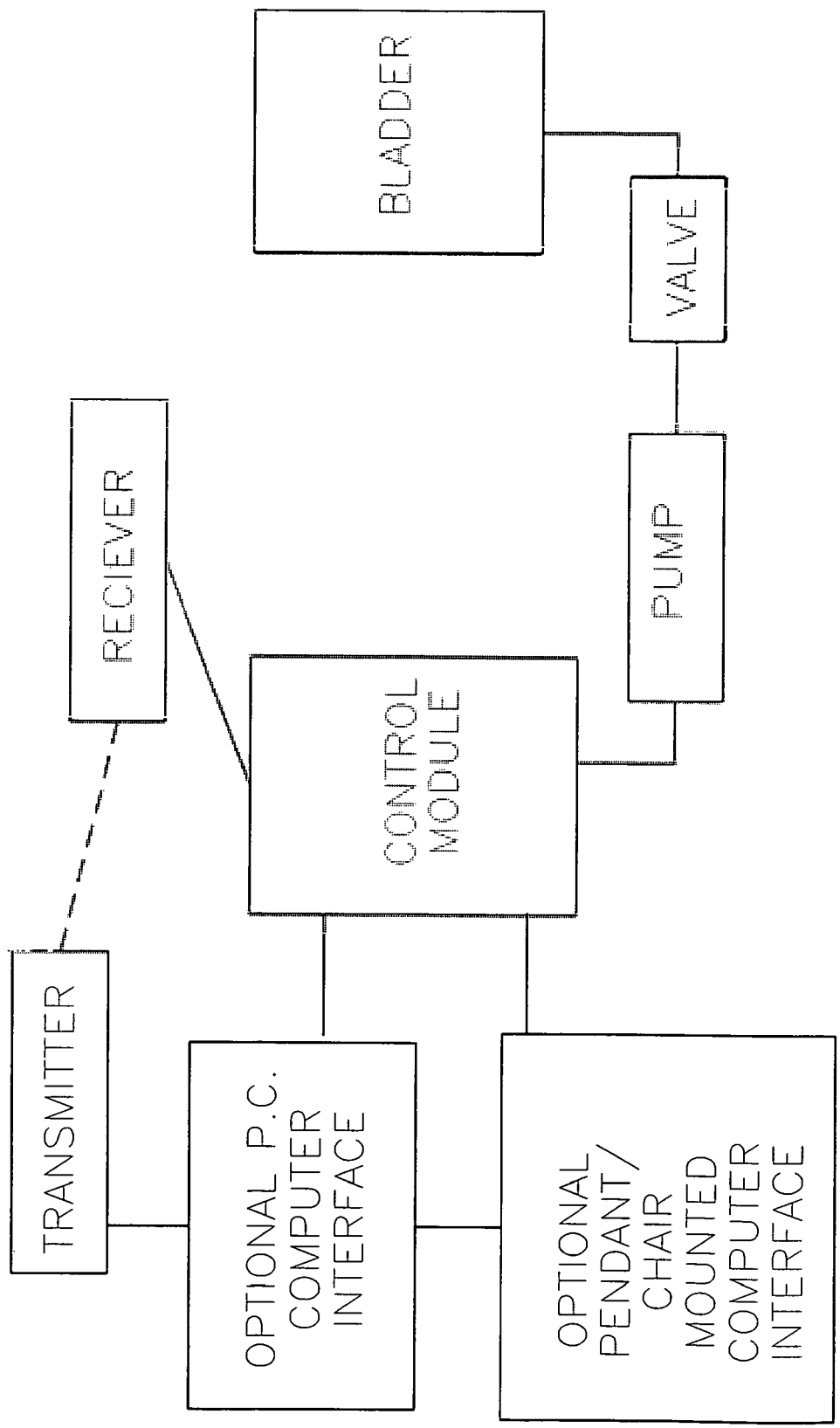
FIG. 5 is a schematic illustration of one embodiment of the invention.
Figure 6:
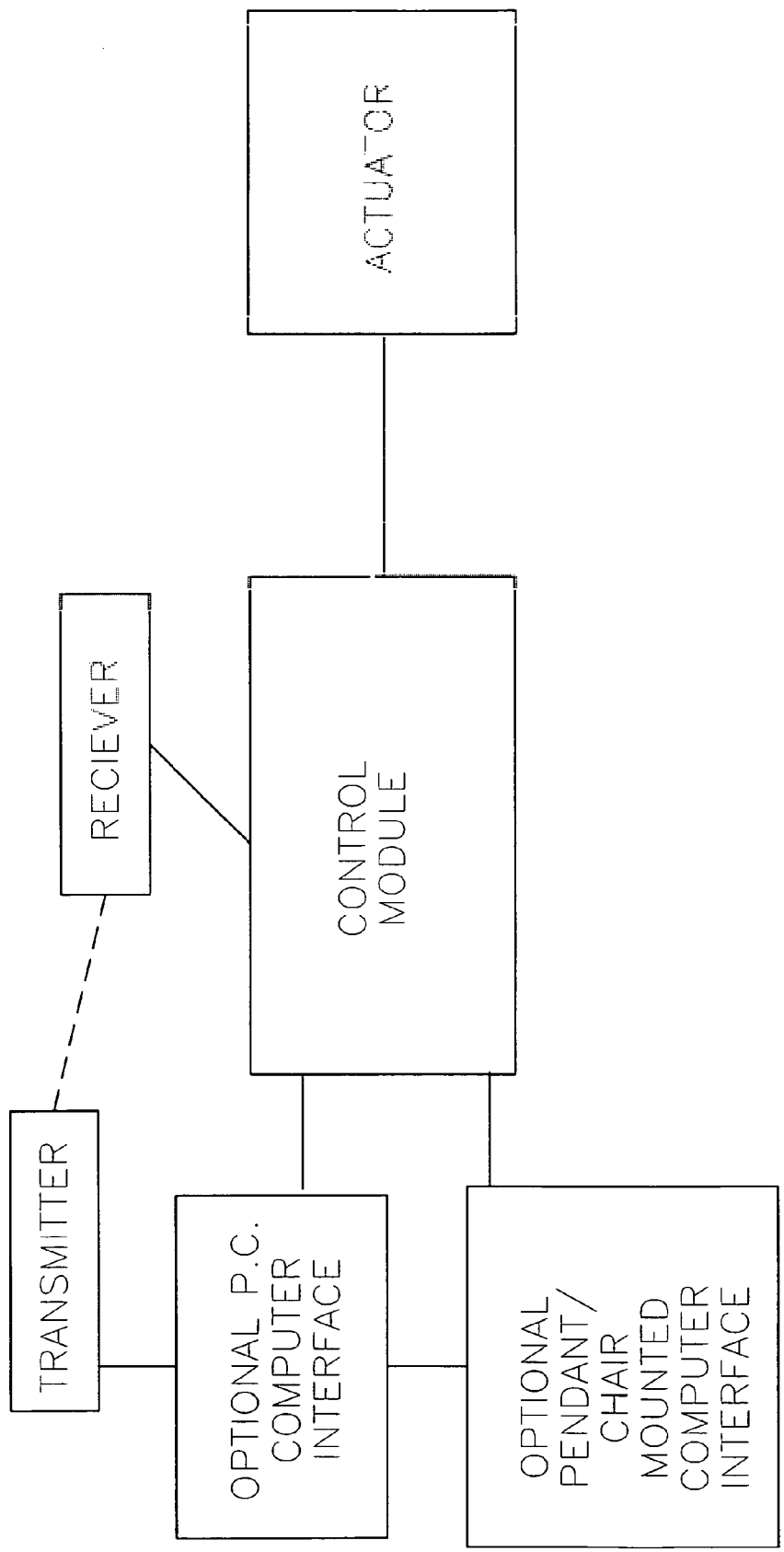
FIG. 6 is a schematic illustration of one embodiment of the invention.

Referring to FIG. 5, a schematic representation of one embodiment of the invention can be seen. As depicted the schematic relates to a bladder system, however as can be seen by referring also to FIG. 6, any of the other contemplated actuators may be employed with the appropriate modifications. Either the P.C. computer interface, or the pendant/chair mounted programmable interface, or both may be employed at any given time. And in some cases the pendant/chair mounted programmable interface are combined into a single unit. At any rate, it can be seen that the host P.C. computer may be directly tethered to the control module or as previously discussed communicate via a transmitter and receiver (dotted line). Although a single bladder/actuator and associated elements are illustrated, the control module, may have as many actuators as is deemed necessary linked to it. In the illustrated embodiment, a pump is used to inflate the bladder with a fluid medium such as air and the valve is used to release the fluid. The valve may be positioned in any fluid communicating position with regard to the bladder, and thus does not need to be in line with the pump. Alternatively, when the system is to use a fluid medium other than air, an appropriate holding vessel for the fluid can be provided when the bladder/hydraulic system is to be deflated. Referring to FIG. 6 a figure much like FIG. 5 can be seen, and the differences between these two figures has already been described.

Figure 7:
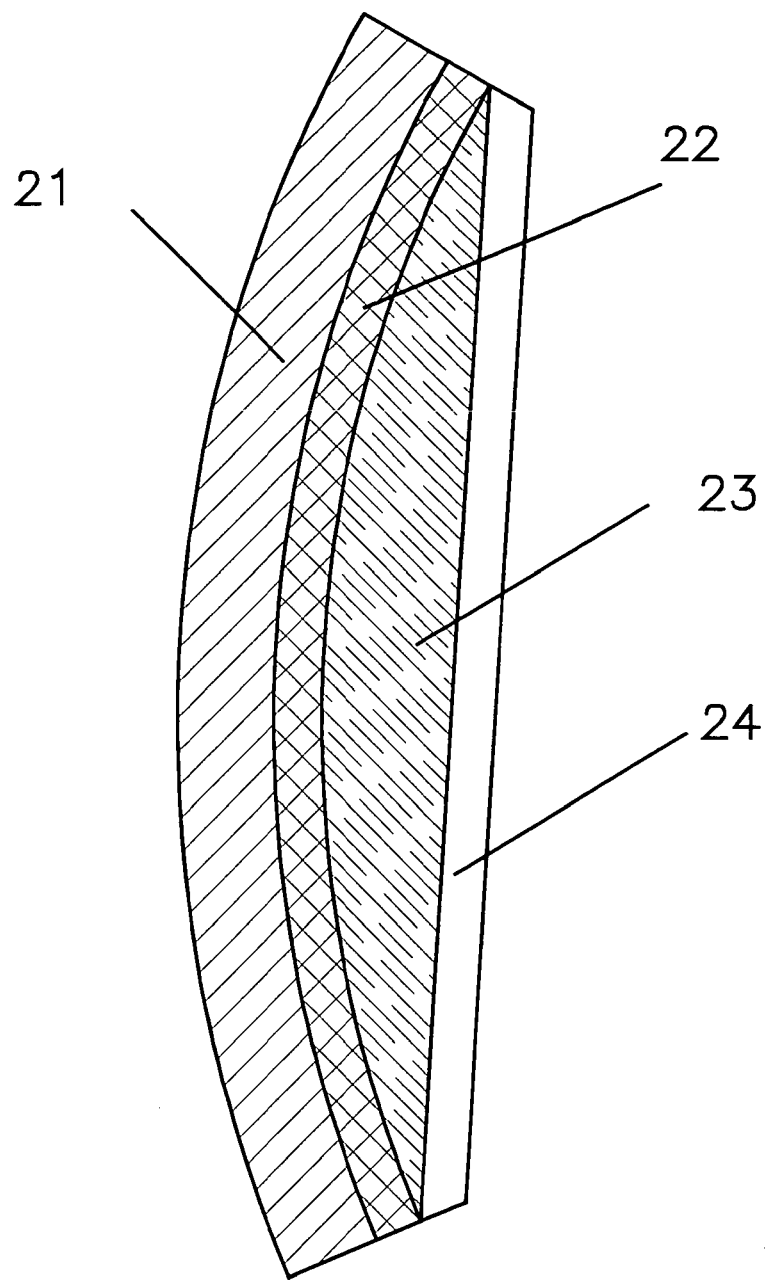
FIG. 7 is a side sectional view of one embodiment of the invention.

Referring to FIG. 7 a partial cross section through a seat back can be seen. An outer shell surface 21, can be seen. This surface may be made of foam which optionally may be covered in fabric, as is common. Alternatively, this surface may be of a deformable membrane like material such as fabric or rubber sheeting. And alternatively yet, this surface may be of a shell like material. An optional intermediate shell or dissipation layer 22, can be seen. This surface may also be made of foam. Alternatively also, this surface may be of a deformable membrane like material such as fabric or rubber sheeting. And alternatively yet, this surface may be of a deformable or non-deformable shell like material such as plastic, so that its shape may be resiliently altered, or alternatively, it may alter the shape of outer surface 21. This layer 22 may be an overall layer or segmented in nature.

Figure 8:
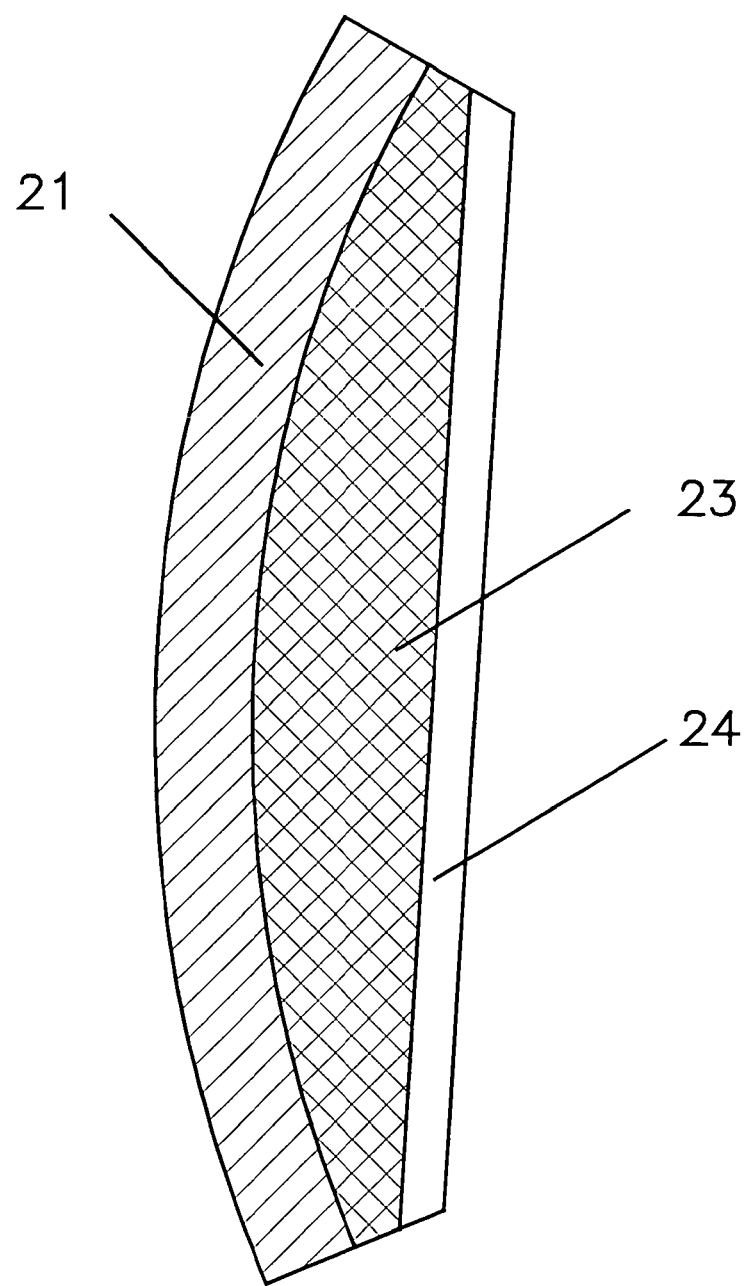
FIG. 8 is a side sectional view of one embodiment of the invention.

Referring to FIG. 8, a view substantially similar to view 7 can be seen. This view simply shows that the dissipation layer 22, is not always necessary. This has been found in the cases when the actuator is of the variety where no dissipation layer is necessary such as a vibrational or heat generating actuator, when the foam or outer surface layer 21, can act as a dissipation layer, or when the actuator itself has features that act in a manner substantially similar to a dissipation layer and/or contour form.

Figure 9:
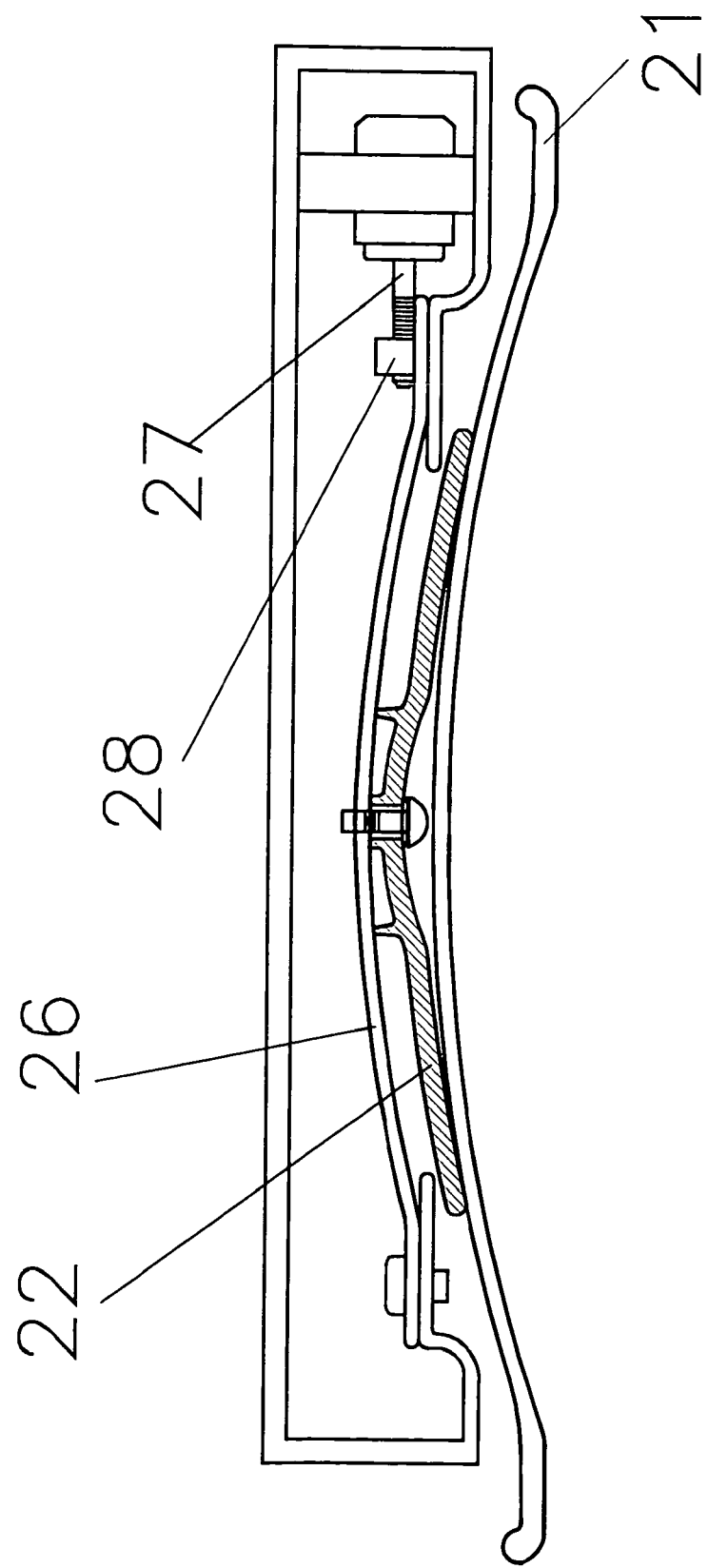
FIG. 9 is a sectional view of one embodiment of the invention.

Referring to FIG. 9, a cross sectional view can be seen. In this view it can be seen that a motor/screw actuator 27 may pull a flexible member 26, via actuator nut 28, thus pushing dissipation layer 22, which may or may not be resilient, forward, thus either firming or recontouring outer surface 21, depending upon the materials/structure selected and/or this actuator's position relative to other actuators or elements/surfaces within the system.

Figure 10:
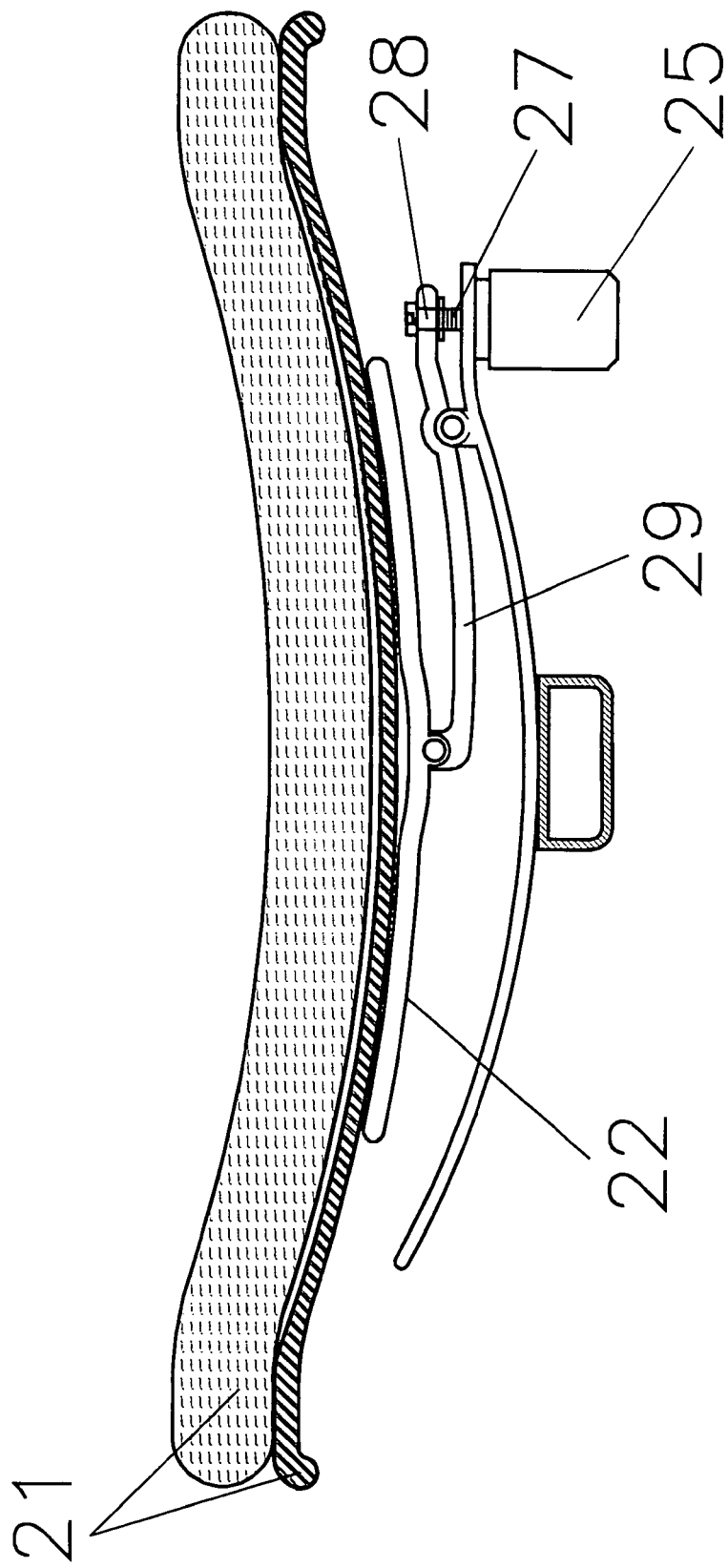
FIG. 10 is a sectional view of one embodiment of the invention.

Referring to FIG. 10, another cross sectional view can be seen. In this view it can be seen that a motor/screw actuator 27, may pull a lever 29, via actuator nut 28, thus pushing dissipation layer 22, which may or may not be resilient, forward, thus either firming or recontouring outer surface 21, depending upon the materials/structure selected and/or this actuator's position relative to other actuators or elements/surfaces within the system.

Figure 11:
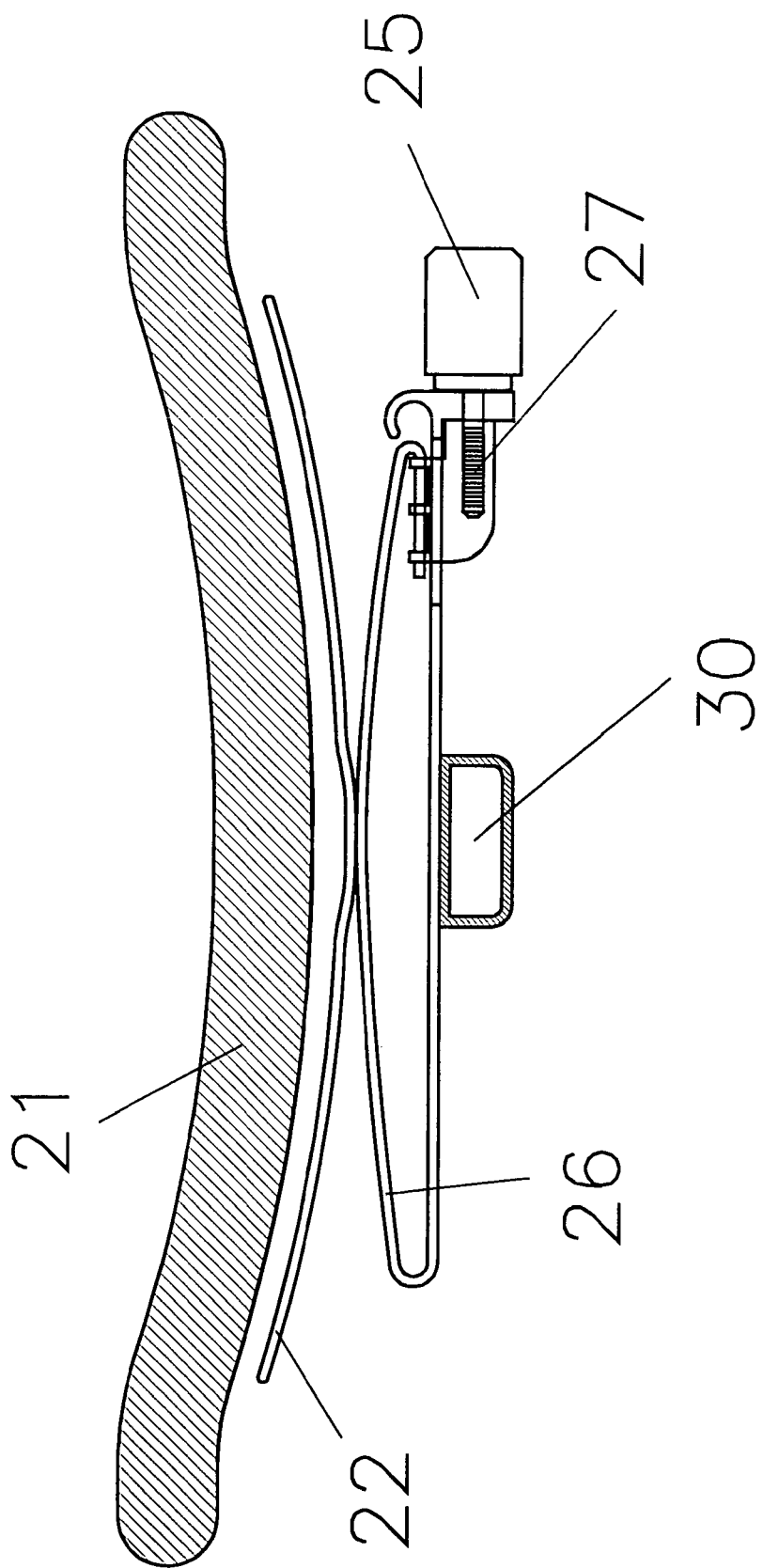
FIG. 11 is a sectional view of one embodiment of the invention.

Referring to FIG. 11, another cross sectional view can be seen. In this view it can be seen that a motor/screw actuator 27, may push or pull flexible bow member 26, via actuator nut 28, thus pushing dissipation layer 22, which may or may not be resilient, forward, thus either firming or recontouring outer surface 21, depending upon the materials/structure selected and/or this actuator's position relative to other actuators or other elements/surfaces within the system.

Figure 12:
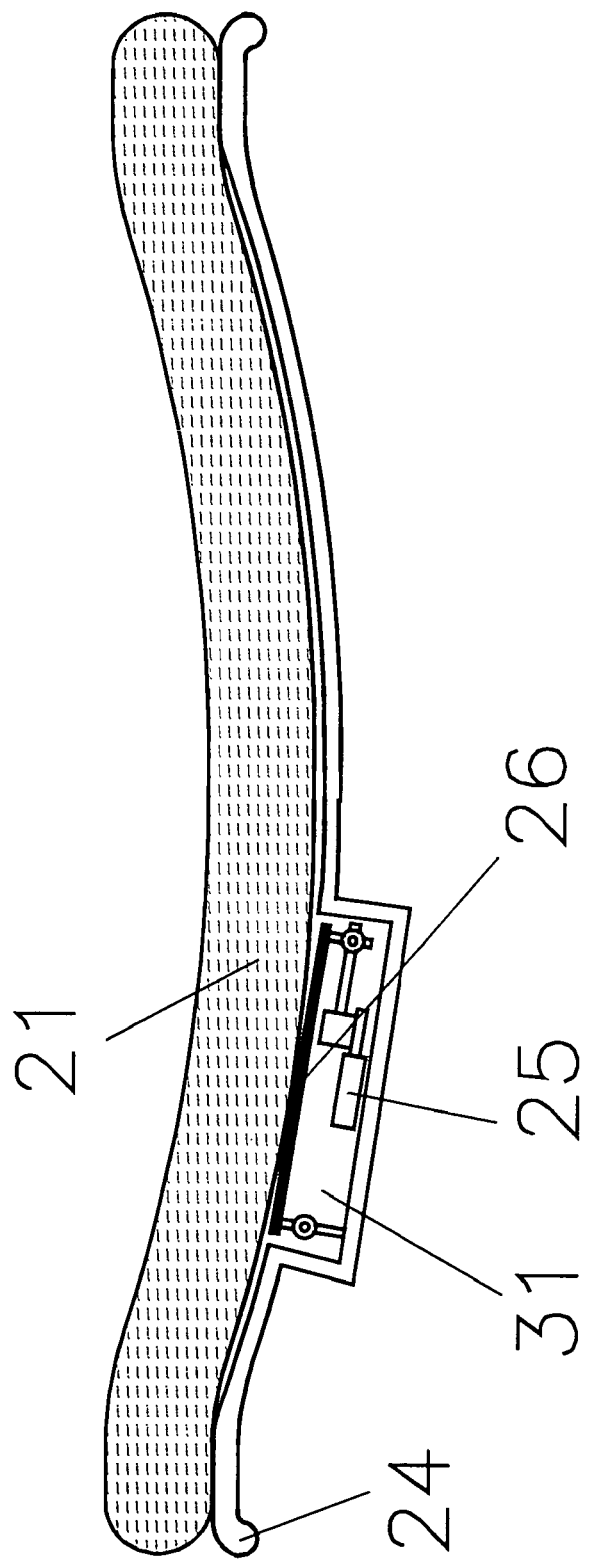
FIG. 12 is a sectional view of one embodiment of the invention.

Referring to FIG. 12, an actuator much like that depicted in FIGS. 13-18 can be seen. Of note, is the pocket 31 that can be formed into a support or support shell 24, to accommodate an actuator. Other features of FIG. 12 will become apparent after a review of the other pertinent figures.

Figure 13:
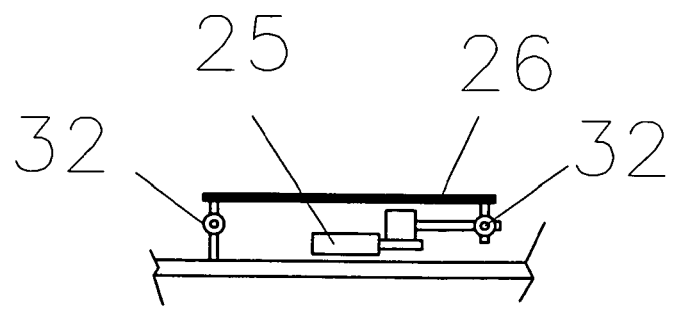
FIG. 13 is a detail side sectional view of an actuator of the invention in a first position.
Figure 14:
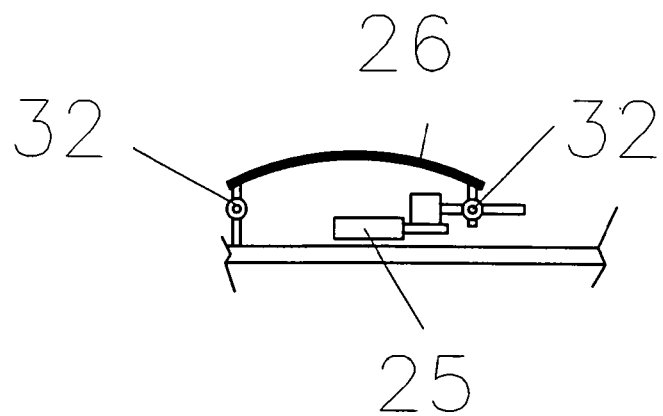
FIG. 14 is a detail side sectional view of an actuator of the invention in one of many and variable second positions.

Referring to FIG. 13, a side view of a potential actuator can be seen. When a mechanical actuator 25, such as a motor, draws on flexible member 26, bowing of 26 can be accomplished, as can be seen by referring to FIG. 14. FIG. 14, shows substantially the same mechanism of FIG. 13, in an alternate position. In some cases, appropriate pivots/virtual flex pivots 32, may be appropriately incorporated.

Figure 15:
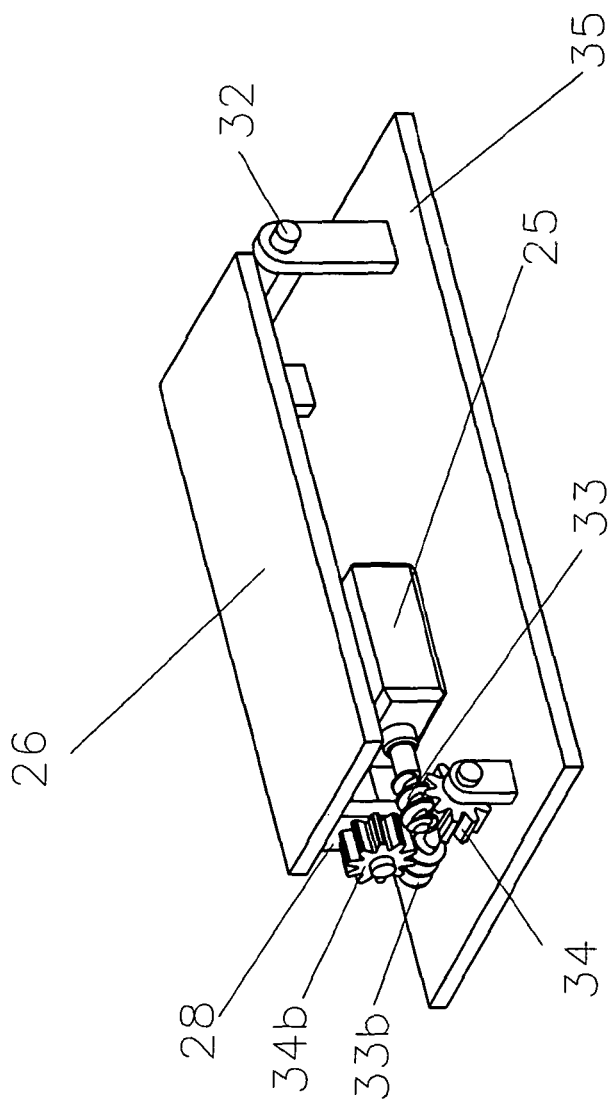
FIG. 15 is a trimetric view of an actuator, much like that of FIG. 13, of the invention in a first position.
Figure 16:
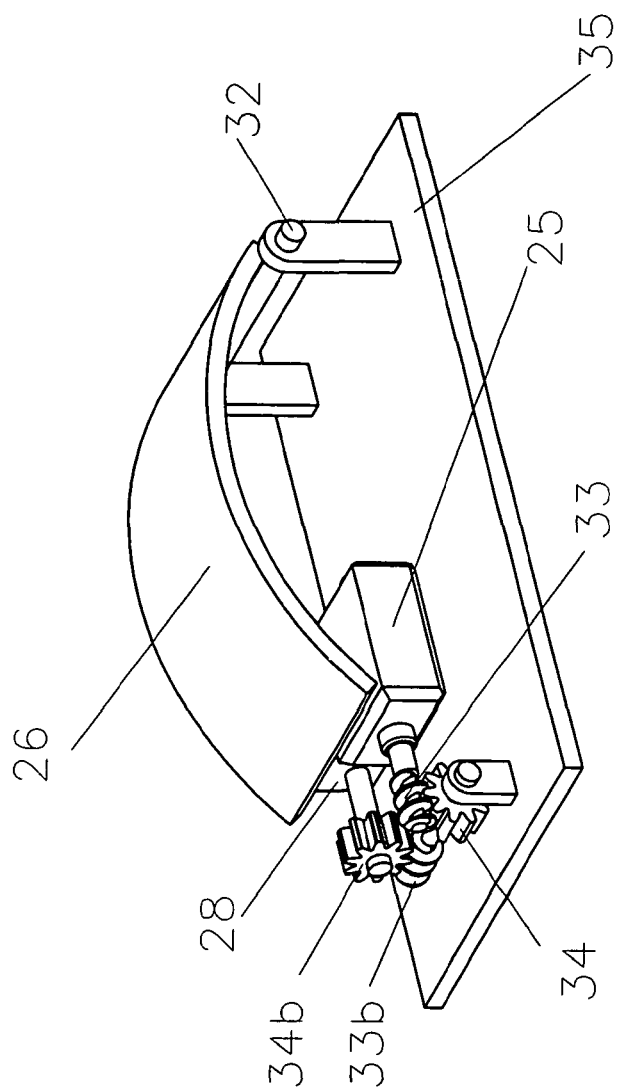
FIG. 16 is a detail a trimetric view of an actuator, much like that of FIG. 14, of the invention in one of many and variable second positions.

Referring to FIG. 15 a mechanical actuator much like that of FIGS. 13 and 14 can be seen, however in FIG. 15, a trimetric view is shown in greater detail. A mechanical actuator 25 is shown. This mechanical actuator could be a rotary motor, a linear motor, a piezoelectric motor, nytinol wire based motive force, etc. As shown it is a relatively small rotary electric motor which drives worm 33. Worm 33 drives spur 34, which in turn is directly coupled to worm 33-b, which is coupled to spur 34-b, which is directly coupled to a screw that drives nut 28. In this way a very compact, highly reductive/highly powerful drive can be accomplished, that also through the use of worms and/or the screw is self-locking in nature, so that the actuator's holding power electrical requirements are zero. Obviously, a variety of reduction drive types and arrangements could be employed and are anticipated. Once nut 28 is caused to translate, flexible member 26, may assume a variety of positions. FIG. 16 is essentially the same mechanism of FIG. 15, in an alternate position.

Figure 17:
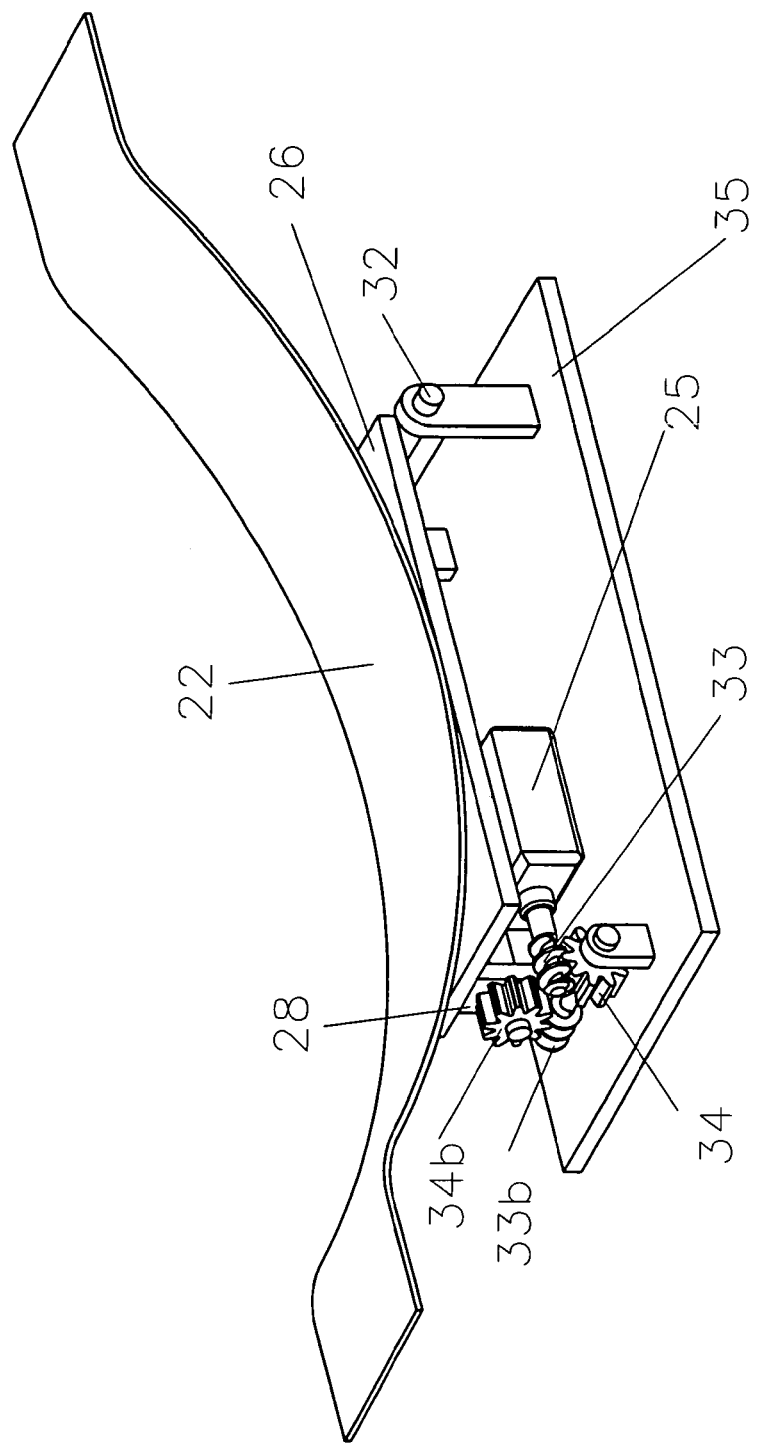
FIG. 17 is a detail a trimetric view of an actuator, much like that of FIG. 15, of the invention in one of a first position with an associated dissipation/contour member.
Figure 18:
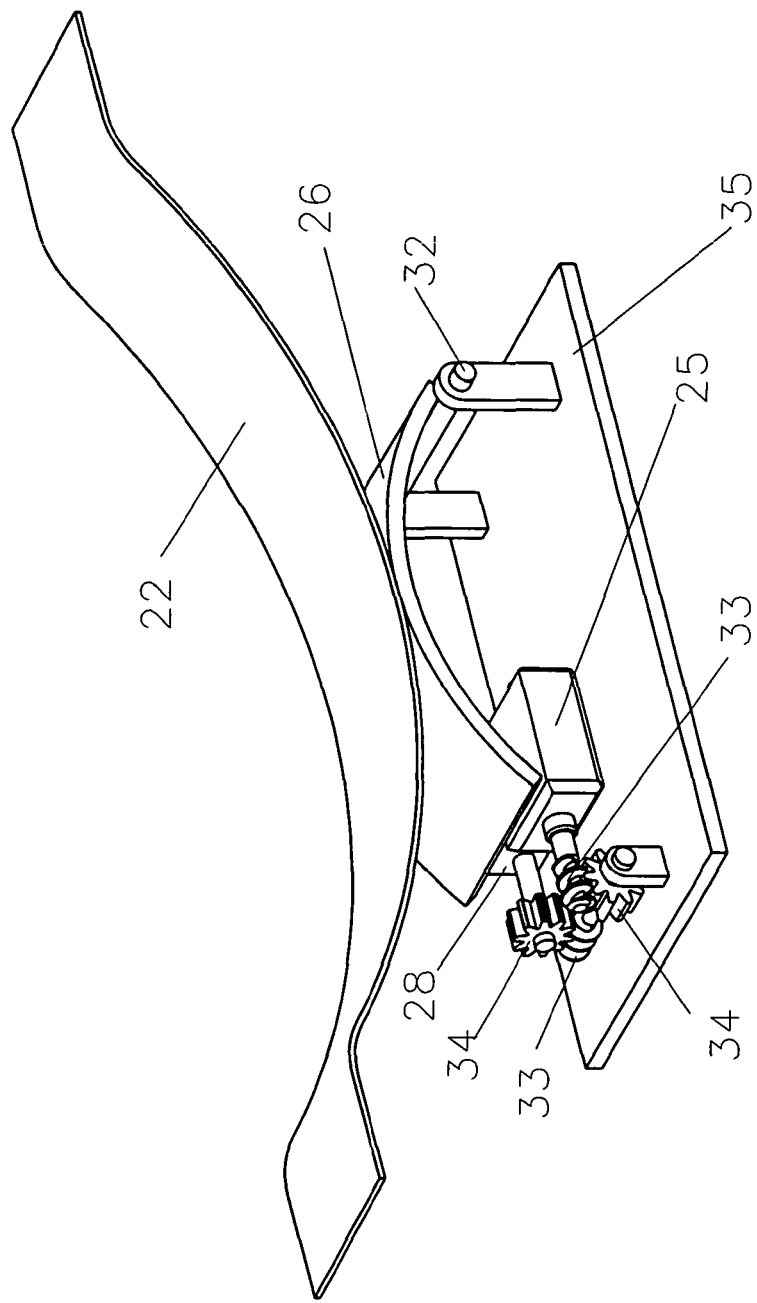
FIG. 18 is a detail a trimetric view of an actuator, much like that of FIG. 16, of the invention in one of many and variable second positions with an associated dissipation/contour member.

FIG. 17 is substantially the same mechanism as FIG. 15, however it is shown that an inherent dissipation layer and/or contour form, (depending on the relative resiliency of the materials or structures) may be integrated into the actuator. And FIG. 18 is essentially the same mechanism of FIG. 17, in an alternate position.

Several methods of feed-back from the actuators is anticipated in order for the controller to accurately return any given actuator to a desired position or state. As previously mentioned, an actual sensor may be used such as a potentiometer, proximity sensor, optical encoder or other known feedback/sensor systems. This type of solution is considered closed loop in nature as the controller sends out a command, and the sensor is able to communicate that the command was received, and properly executed. Additionally, depending on the sensors employed other data can be communicated back to the controller such as pressure the support surfaces relative position with regard to a vertical/horizontal axis etc.

Other methods of the controller being able to know the position or state of an actuator that are open loop in nature are also anticipated. One such method is for the controller to send a signal that would cause the actuator to move to an extreme of its travel, or a position that would over-travel if a stop were not hit. Now the controller knows a (zero or reference) positional state of the controller and can send out a signal with a time duration appropriate to move the actuator to the desired position/state. Another method of open loop control is to use steppers. This is much like the aforementioned method, except that much greater precision is achievable. The zero position is achievable in the way already described, or with more rudimentary sensors (than optical encoders etc.) such as limit switches.

Referring to FIG. 19, a plan view of one type of P.C. based graphical user interface (GUI) is depicted. Pictorial depictions of the seat 1, and the back 2, are shown. As shown, the user may simply use a mouse, keyboard or other input device to select positive (+) or negative (−) values for any of the depicted zones. Additionally, by using the various pull downs, right/left-clicking/keyboarding or other common P.C. inputting methods, the user may select or invoke various presets, create presets, save presets, time presets, select users etc. or accomplish any of the before mentioned/described modes of operations. If such a GUI were pendant, a remote or non P.C. based, the graphical icons and controls could be located on a dynamic LCD or equivalent based display. Alternatively, if such a GUI were pendant, a remote or non P.C. based, and static in nature, the graphical icons could have the appropriate switches associated with them.

It should be noted that it is anticipated that it may be desirable to incorporate a manual over ride for various axis of movement. This could be useful in the case of power failure, component failure, or the necessity for a manual adjustment for speed/safetyegress etc. One anticipated inventive method is to incorporate a pivot-nut, spring biased nut, or other variable nut that rides on the drive worm/screw. In this way, the nut which moves with the element/axis to be adjusted may be disengaged, the element moved to a new position and then the nut reengaged with the drive worm/screw. So the nut and screw may actually emulate a linear rack and pawl for manual, non-powered adjustment.

Referring to FIG. 20 through 24, another graphical user interface is depicted. Here, as before, the graphical icons and controls are located on a dynamic LCD or equivalent based display. Of note is that the elements of the seating surface may be "grabbed" by the inputting methods, and graphically moved, stretched, and/or deformed into a new position or shape, thus giving additional graphical feedback relating to the system. So the user could select an item such as a headrest with a computer mouse, or with their finger(s) in the case of a touch screen, and change the element as desired. This could be accomplished through the familiar actions of clicking and dragging, in the case of a mouse, or tapping and finger sliding, in the case of a tactile input. Such a tactile input may also support haptic feedback. Such feedback is useful in giving the user a sense of their desired input, and thus a greater level of control. A touch screen interface may be desirable in certain environments where a mouse and/or keyboard are not present or desirable. One such environment is in vehicles. The control for the support surfaces may be integrated into another part of the vehicle. One such location would be on the dash board, or in the case of rearward seating, on the back of the seat in front of the seat to be controlled. Another location is a drop down/flip-down screen from the roof of a vehicle. And yet another is a projected heads up display which may "float" on or before a surface such as a windshield. In this way the graphical user interface may be used on the same display as that used for other functions such as GPS (global positioning system) stereo/radio control, or other entertainment functions such as video players etc.

It has been found to be advantageous to limit certain motions or restrict when certain other events are occurring. One example is that the control of the current invention when employed in vehicular seating may restrict seat position movement relative to the floor pan when the vehicle is moving, or moving at a set rate/speed so that seat to pedal dimensions are retained when the vehicle is moving. Another example of this anticipated mode of operation, is that the seat back angle (trunk to thigh angle) may be limited when the vehicle is moving, but unlimited when not. This would prevent users from driving from a "lying down position" or semi "lying down position." This has safety implications both from a driving safety position but also such a position can defeat safety devices such as seatbelts and airbags in the case of an accident. This system would still allow an occupant to assume that potentially restful position when the vehicle is at a relatively safe speed or stopped.

As was discussed earlier, it is often ergonomically desirable to have the position of a support surface, the shape of a support surface, or the firmness of a support surface change in response or in concert with another changing variable. As already discussed, this could be the changing of the user's task, the shifting of weight and/or position within the supporting surfaces, or induced by the change of the position of one or more support surfaces relative to each other or the ground plane. One such cited example is that it has been found that lumbar and/or sacral requirements can change relative to the amount of recline one assumes. This could be any or all of the previously mentioned shifting of weight, changing of task, shifting of weight and/or position within the supporting surfaces, or change of the position of one or more support surfaces relative to each other or the ground plane. Whereas, if someone simply shifted from side to side with a support surface/chair, this could cause a similar change (or different asymmetrical change) in the lumbar and/or sacral requirements.

Another area of interest, and novel direction of the invention, relates to headrests. This has been discussed earlier, but will be expanded upon here. When one reclines, and is using a computer monitor, driving, watching television, or engaged in other similar activity, the desire is to have a headrest move forward to maintain that field of view. As a matter of fact, there have been chairs with headrests that have a linkage mechanism to accomplish this as the user reclines. The shortcomings of this are numerous, but some of the outstanding ones are these. In the solutions to date, the amount that the headrest moves forward is a prescribed amount dictated by the linkage used. So even if a starting position were set, the final position is a result of the linkage utilized, and if a final-reclined headrest position is setm vise versa. Additionally, this does not take into account all the positions between a first and final position, i.e., semi-reclined. So a nonlinear ratio is unattainable, and if it were, it would not be customizable. Next, this scenario assumes that a given field of view is to be maintained, and also assumes what that field of view is to be. Contrary to this is the person who wants to recline to read. Many people like to hold a book or paper with their elbows supported on the armrest (which may reposition for this task) and the book or paper is elevated. In this case, the most comfortable position is to actually have the headrest stay static or move rearward (depending on the user) as the user reclines. This is completely contrary to what the linkage solution dictates. Also, some people actually use their eye movement more effectively or differently than others, reducing or increasing the factor, impact and comfort of head position. These same relationships, and changing relationships occur throughout the chair's support surfaces. These relationships include the relative position (to the other support surfaces or the ground plane) of the arm pads, the attitude of the seat to the back, the seat to the floor, the back to the floor, leg-rests to the seat-pan, the headrest as discussed, etc. and then all the associated relative contours of these support surfaces. As previously discussed, these changes may be invoked because of or though the presets, positional sensors, pressure sensors, the movement of other support surfaces automatically or manually, or the like. Only this invention addresses all of these variable situations in a variable and customizable way that can be invoked manually or automatically by the user or the system.

Another anticipated input and graphical feedback is where a switch itself contains a dynamic display. In some cases this may be an LCD or alternatively an OLED type. This display can change to indicate the input and effect that the use of the switch would impart. In this way, a single switch may be used for a variety of changing functions. This could be especially useful in certain applications such as loungers, couches or on the sides of an automotive/airline or other vehicular seat. One such company that produces this type of technology is United Keys. As said this could occur on the side of the seating/support surface or on another surface such as a remote control like device the dashboard of a vehicle or behind a concealing panel such as under a flip up arm cushion.

Another anticipated mode of input that can be used with some or all of the other options outlined in this disclosure is that a cell phone, PDA, or as already mentioned a common remote control may be used as a controlling interface. Also many of these devices are increasingly employing HTML or other universal interfaces which as discussed has some advantages. With these and the other disclosed interfaces, a stylus may be used as in input as well a voice recognition as well as hand or other gestures within the general proximity of the support surface or display interface to input the user's intent.

Another anticipated mode is one where a multitude of support surfaces may be controlled and monitored from a single GUI. This could be particularly useful in hospitals or other clinical settings. A nurse could set up a chair or other support surface using a handheld computer, and then the support surface could react in the ways already described, thus creating stimulation and increased blood flow for the occupant already discussed. Additionally, the movements, heating, cooling, massage-vibrational and other may provide other therapeutic benefits. As before the GUI may provide an inputting architecture, and then there may be a separate microprocessor associated with the support surface for intermediate control. The surface may also transmit data back to the GUI or another central control center. This data could include blood pressure, heart rate temperature etc.

The following discussion relates to Attachments 1, 2, and 3; Exhibits A, B, C and D; and "Excerpts from some of the Inventor's Various Notes" of U.S. Ser. No. 12/648,272, as originally filed. These attachments, exhibits, and excerpts are incorporated here by reference.

Referring to FIGS. 1 and 4 of attachment 1, a pressure map of a person seated on a support surface can be seen. These pressure mats are often placed on a seating surface so that designers may assess their work, and additionally back correlate that information to the feedback individuals verbally give concerning seating comfort.

Of note is that different people will produce differing "pressure profiles" when seated on the same surface. This is because, as has already been noted, individual body-types vary greatly in size, shape, and weight distribution, as well as the body's own padding. Using the aforementioned sensors, such a mapping could be used to alter the surface to optimize the pressure points for an individual. A graphical approximation of this could be displayed on the GUI and the occupant could see the direct effects of their changes. The term "graphical approximation" is used as it is anticipated that a novel and advantageous, from a cost, reliability and simplification perspective, approach may be to interoperalate (increase resolution based on assumables) the data from a few data points, or sensors and thus create a continuous interpretation of that data for processing or viewing through the GUI or printouts.

Exhibit A is printed out pages from an internal, confidential, nonpublic presentation given on the inventors computer on Jun. 10, 2008 in Chicago with a Confidentiality agreement in place.

Exhibit B is printed out pages from an internal, confidential, nonpublic projected presentation the inventor gave on Jul. 1, 2008 in Grand Rapids/Kentwood Michigan with a Confidentiality agreement in place.

Exhibit C is printed out pages from an internal, confidential, nonpublic, projected presentation the inventor gave on Aug. 27, 2008 in Grand Rapids/Kentwood Michigan with a Confidentiality agreement in place.

Exhibit D contains actual images of the invention.

Images labeled as FIGS. 20-25 are screen shots of an actual GUI.

Images labeled as FIGS. 26-31 are photos of a chair that is controlled by the GUI interface of FIGS. 20-25. Its arms may individually move up and down and individually move in and out (width) relative to the rest of the support surfaces. The back angle may be altered as can be seen in FIG. 30. Its seat depth may be changed fore and aft. The angle of the headrest may be altered with the GUI. The lumbar can also be altered with the GUI, as well as other contour alterable actuators. These images include the reference numerals:

36. Closed loop Feedback module such as a potentiometer, encoder etc.
37. Wireless receiver
38. Battery holder The attachments are:

Attachment #1 "Aeron—The Art of Pressure Distribution" is a white paper from Herman Miller Inc. explaining an existing use of pressure mapping in chair design. Also presented is an explanation of some of the challenges in making a chair that exhibits even and proper pressure distribution for a wide variety of body sizes and shapes.

Attachment #2 "Cross Performance at Work" is a white paper from Herman Miller Inc., and substantiates the inventors previous outlining of the importance of multiple postures throughout the day, users not adjusting their chairs throughout the day, the importance of a worker being able to adapt to various tasks and thus not be limited by his work surfaces or chair, and also affirms the fact that a variety of workers that may share the same work surfaces and chairs.

Attachment #3 "If the Chair Fits" is a white paper from Herman Miller Inc. It like Attachment #2 "Cross Performance at Work", covers the various issues in chair design, points out that a complete solution is unrealized, and thus serves to further support the importance and significance of the invention at hand.

These attachments and their references serve to further demonstrate various ergonomic challenges, needs and difficulties of making seating surfaces accommodate the wide range of body types of individuals and the wide range of tasks that these individuals are involved in.

Thus, a new and improved method of support surface construction and variety of associated actuators has been provided for. One aspect is that these improved methods provide greater comfort through the user being able to customize the support surface. Whether it be by altering the contour and/or firmness, of a support surface, or by vibrating, or heating/cooling the support surface or by altering the overall relative position of a support surface. Also provided is a new and novel interfaces for controlling the actuators as well as new and novel methods of charging a battery that may drive the actuators.

I claim:

1. A variable seating system comprising:
   a. a body support surface;
   b. more than one actuator adapted to change a state of the body support surface;
   c. a screen adapted to receive input from a user; and
   d. a graphical user interface displayed on the screen for controlling more than one of said actuators, where said graphical user interface:
      i. depicts a dynamic picture of at least a portion of the body support surface,
      ii. enables a user to select one of the actuators for adjustment;
      iii. accepts an input manipulating the appearance of said dynamic picture of the body support surface by graphically deforming an element of said dynamic picture of said body support surface to select a change in state of the body support surface; and
      iv. controls the selected actuator to change a state of the body support surface as selected by the user.

2. The system of claim 1, where said screen accepts the input from a finger.

3. The system of claim 2, where a user can graphically input intent by using a finger to move a graphical representation of the body support surface from a first on-screen position to a second on-screen position.

4. The system of claim 1, where said screen accepts the input from a stylus.

5. The system of claim 4, where said stylus can graphically input intent by moving a graphical representation of said body support surface from a first on-screen position to a second on-screen position.

6. The system of claim 1, where the body support surface comprises an instrument to measure data selected from the following; blood pressure, heart rate, or temperature.

7. The system of claim 1, where the actuator moves to change a state of the body support surface and the motion of the actuator is limited under certain modes of operation.

8. The variable body support system of claim 1, where the input manipulating the appearance of said dynamic picture of the body support surface is accomplished through the use of a voice command.

9. The variable body support system of claim 1, where the input manipulating the appearance of said dynamic picture of the body support surface is accomplished through the use of a cell phone.

10. The system of claim 1, where the control of the actuator can be overridden.

11. The variable seating system of claim 1, adapted for a motor vehicle, in which the body support surface is adapted to be installed as automotive seating disposed within a motor vehicle.

12. The system of claim 1, where said screen accepts an input moving a graphical representation of the body support surface from a first on-screen position to a second on-screen position.

\* \* \* \* \*